United States Patent Office 2,919,891
Patented Jan. 5, 1960

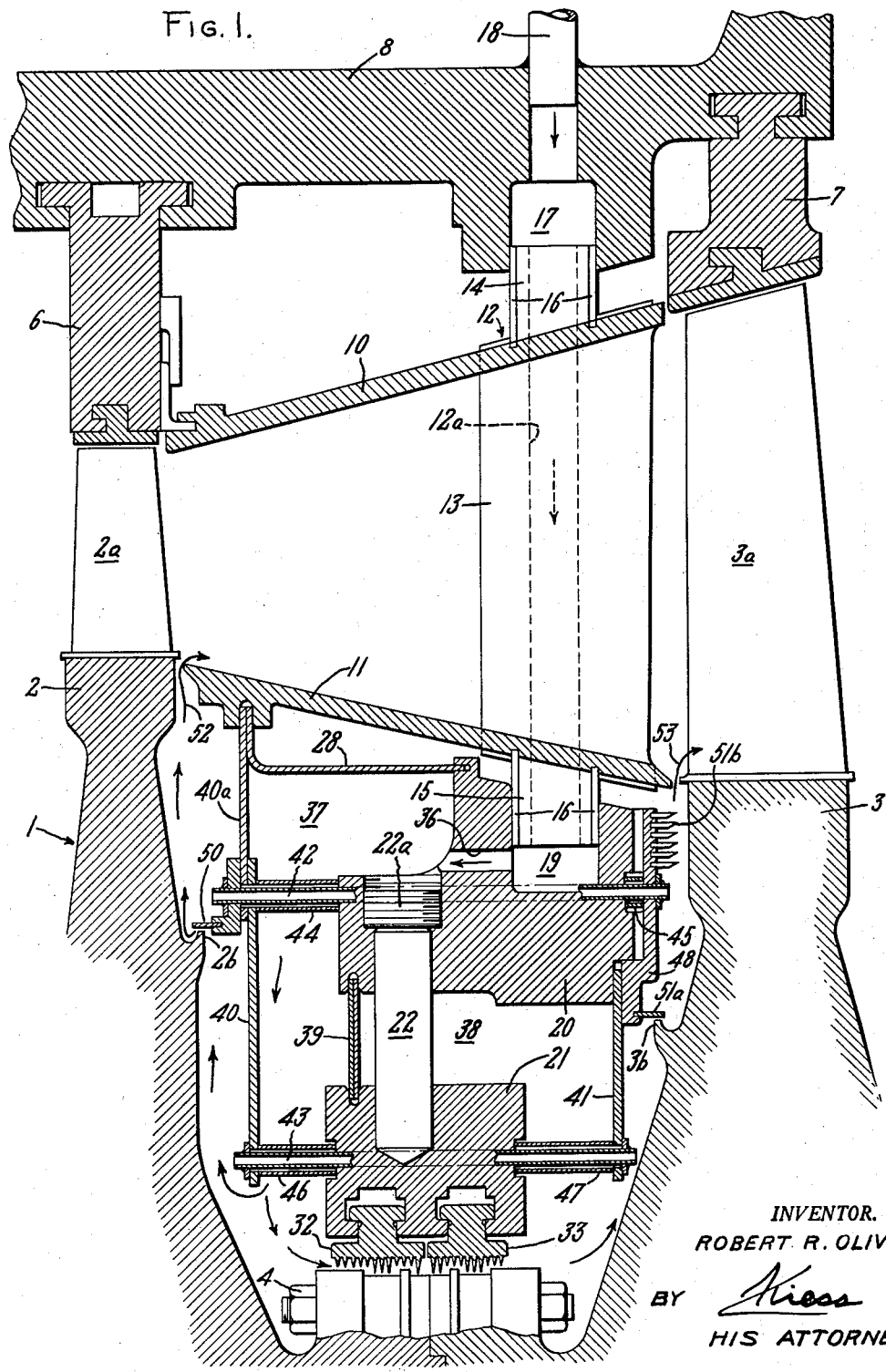

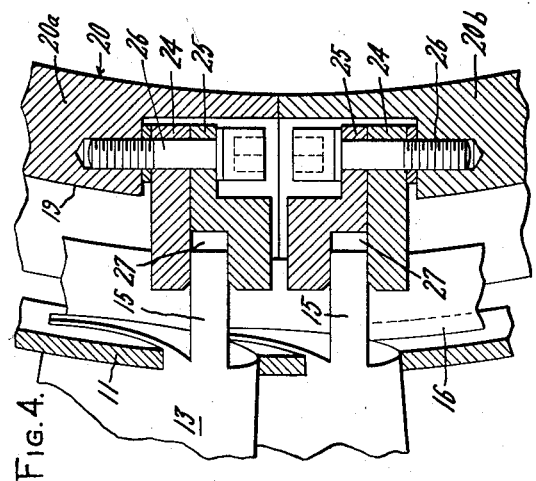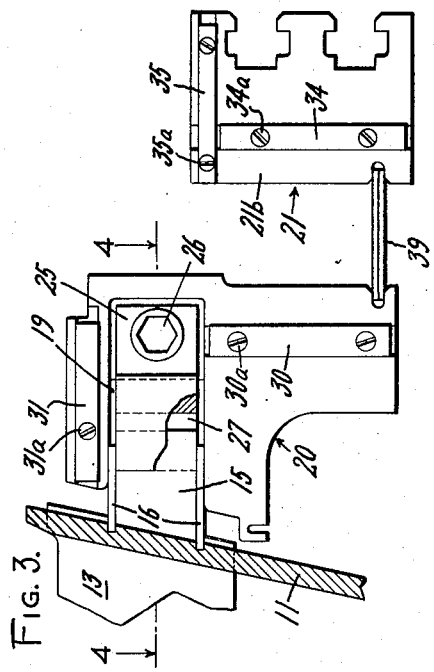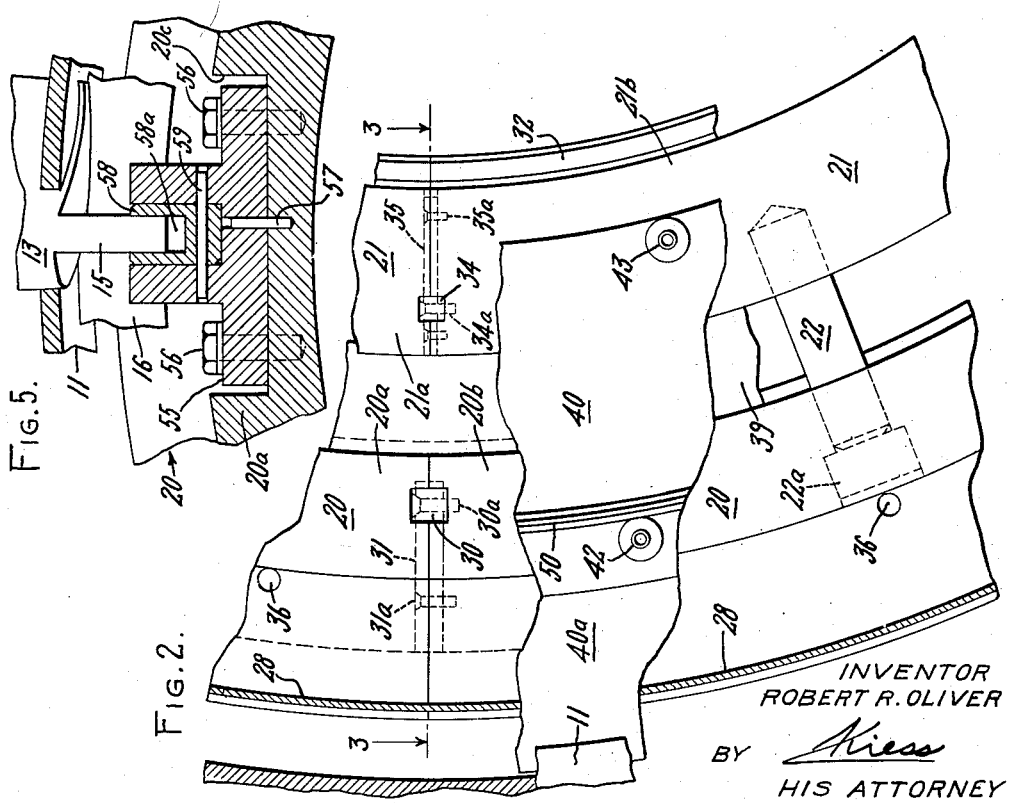

2,919,891

GAS TURBINE DIAPHRAGM ASSEMBLY

Robert R. Oliver, Scotia, N.Y., assignor to General Electric Company, a corporation of New York Application June 17, 1957, Serial No. 665,997

6 Claims. (Cl. 253—78)

This invention relates to gas turbines and more particularly to a multi-piece diaphragm assembly which prevents the leakage of motive fluid around the nozzle partitions while maintaining the desired clearances between the diaphragm assembly and the rotor when subjected to high gas temperatures.

In the design of gas turbine powerplants, a major consideration is the provision of arrangements for permitting free differential thermal expansion between relative parts without producing undesirable deformation of the rotor or material alteration of the clearances between the rotor and various stationary parts.

Also, since the pressure of the hot gases flowing through the turbine is higher than atmospheric pressure, there is a tendency for the hot gases to flow radially inwardly through the clearance gap between the turbine rotor and the nozzle-guide-vane assembly or associated stationary structure. Such a flow is undesirable since it would result in heating of the surface of the turbine rotor disk.

To avoid this heating of the rotor disk, it is common practice to provide, adjacent the surface of the turbine disk, relatively cool air which is at a pressure higher than the pressure of the hot gases passing through the turbine system, so that there is a radially outward flow of relatively cool air through each clearance gap. Thus, the clearance gaps are "sealed" against the inward flow of hot gas and the turbine bucket wheel will be maintained at a relatively low temperature.

Furthermore, the diaphragm assembly must be designed so that the cooling air introduced between the turbine wheels has a minimum of contact with the hot surfaces to limit the conduction of heat from the nozzle blades and wall to the comparatively cooler adjacent supporting members. This cooling air tends to minimize the thermal distortion of the entire assembly to prevent wear of the packing around the turbine shaft, and any opening of the packing or other fits which would bring about uncontrolled leakage.

The requirement that the rotor be cool for safe operation while the portion of the diaphragm adjacent the nozzle is at a higher temperature could result in a large temperature differential across the diaphragm assembly and the existence of high thermal stresses to distort the diaphragm assembly out of round to permit leakage of motive fluid out of the main flow path and damage to the packing surrounding the rotor.

In the larger gas turbines, it is generally necessary to make the diaphragm in at least two sections in order to assemble it properly. In the particular design disclosed, the diaphragm is made in two halves which are not bolted together; and thus the diaphragm assembly must be constructed so that it will remain concentric relative to the rotor at all times, and not distort to permit leakage of hot gases around the nozzle due to the large differential temperatures existing across the diaphragm assembly.

Accordingly, an object of this invention is to provide an improved diaphragm structure for a gas turbine powerplant capable of operation at high, rapidly changing temperatures without transfer of excessive heat or distorting forces to associated parts.

A further object is to provide a multi-piece diaphragm assembly which remains concentric relative to adjacent bucket wheels while being free to expand in response to high temperatures, to minimize the thermal distortion of the assembly and prevent packing wear around the shaft or opening of the packing or other fits to permit leakage.

A still further object is to provide a diaphragm assembly which limits the heating of the wheel space cooling air while directing the flow of cooling air to the space between the wheels to maintain the turbine wheels at the required low temperature for safe operation.

Other objects and advantages will become apparent from the following description taken in connection with the accompanying drawings in which—

Fig. 1 is an enlarged sectional view of the turbine nozzle and diaphragm structure;

Fig. 2 is a broken away view illustrating the key means for preventing axial and transverse movements between the halves of the diaphragm rings;

Fig. 3 is a view taken along the lines 3—3 of Fig. 2;

Fig. 4 is a view taken along the lines 4—4 of Fig. 3; and

Fig. 5 is a vertical section illustrating the support for the diaphragm assembly relative to the nozzle assembly.

Generally stated, the invention is practiced by providing a diaphragm assembly consisting of radially spaced concentric split rings which are maintained in concentric radially spaced relation by a plurality of radially extending pins, with an improved sealing arrangement for directing the cooling and sealing air from the nozzle blades into the clearance spaces adjacent the bucket wheels with a minimum temperature rise.

Referring now to Fig. 1, there is illustrated a rotor 1 consisting of axially spaced bucket wheels 2, 3 having buckets 2a, 3a respectively. Bucket wheels 2, 3 are connected together by conventional fastenings 4. Buckets 2a, 3a are covered by shroud ring assemblies 6, 7 respectively which are in turn connected to the main turbine casing 8. The details of the shroud assemblies are not important to an understanding of the present invention. Disposed between bucket wheels 2, 3 is a nozzle assembly which directs the hot motive fluid receive from the buckets 2a to the buckets 3a. The nozzle assembly consists of radially spaced concentric outer and inner annular band members 10, 11 having a plurality of circumferentially spaced air-foil shaped nozzle partitions 12 disposed therebetween and having end portions extending therethrough. Band members 10, 11 are of very thin cross section and considerable axial length so as to present a high resistance path for the flow of heat by conduction from the hot parts to the comparatively cooler main frame parts. The nozzle partition 12 comprises a blade 13 extending through the outer and inner bands 10, 11 and lugs 14, 15 extending beyond the bands. The blades are welded to the band members to maintain them in place. The lug 14 extends into recess 17 in casing 8 and lug 15 extends into recess 19 formed in ring 20. Recess 17 receives cooling air under pressure and at a temperature on the order of 350° F. through conduit 18 from a source (not shown) and supplies it to recess 19 through the radially extending passage 12a defined by nozzle partition 12 to provide cooling air to the diaphragm assembly and bucket wheels in a manner to be described later. It remains to note that leakage between adjacent circumferentially disposed lugs 14, 15 is prevented by circumferentially extending "seal pieces" 16, and that the nozzle assembly is supported in the stator housing 8 to permit the nozzle ring to grow radially with temperature change, while maintaining the nozzle assembly coaxial relative to the buckets 2a, 3a. This is important for it is obviously necessary to keep the nozzle ring assemblies exactly coaxial with the respective bucket wheels, in order to preserve the thermodynamic efficiency of the turbine and prevent mechanical interferences. Details of this nozzle ring assembly and support therefor are not disclosed more particularly herein since they are not a part of the present invention, but are covered in the copending application of Andrew N. Smith et al., Serial No. 504,164, filed April 27, 1955, now Patent No. 2,799,473, and assigned to the same assignee as the present application. It is to be noted that the nozzle assembly may be engaged with the outer stationary structure in any other desired or convenient manner.

The present invention particularly relates to the prevention of leakage of motive fluid out of the main flow path, and the proper distribution of the air for cooling the bucket wheels which is supplied through the nozzle partitions 12, accomplished by the novel diaphragm assembly located between the inner band member 11 and rotor 1. This diaphragm assembly essentially consists of radially spaced concentrically disposed relatively thin ring members 20, 21 which are interconnected by a plurality of radial pins 22. Rings 20, 21 are made in halves, which due to assembly problems cannot be connected together. The ring halves 20a, 20b are prevented from moving axially and transversely relative to each other by keys 30, 31 which keys are secured to the lower half by screws 30a, 31a respectively (see Figs. 2 and 3). Ring 20 retains its undistorted annular shape for reasons stated hereinafter.

The halves 20a, 20b of ring 20 are concentrically disposed relative to the nozzle assembly by support assemblies of the type disclosed in Figs. 4 and 5 located in the horizontal and vertical planes of the annular diaphragm assembly respectively. The horizontal support assembly for each half of the diaphragm ring 20 on one side thereof is illustrated in Fig. 4 as consisting of members 24, 25 which are secured to ring members 20a, 20b by bolts 26 and which form recess 27 for receiving lug 15 of nozzle partition 12. One of the diametrically disposed supports for the diaphragm ring in the vertical plane is shown in Fig. 5 as consisting of a T-shaped member 55 located in a recess 20c and secured to ring 20 by bolts 56. Member 55 is lined up relative to ring 20a by dowel 57. Lug 15 of partition 13 is slidably disposed in and spaced from the base of recess 58a in insert 58 located in recess 55a of member 55. Insert 58 is fixed in place relative to member 55 by pin 59 and functions to simplify the fitting of lug 15 to member 55 by eliminating the machining of member 55. It can be appreciated that with the foregoing support arrangement, ring 20 is maintained exactly concentric with respect to the nozzle assembly, and the rotor 1 and bucket wheels 2, 3. That is to say, ring 20 and nozzle partitions 12 are free to radially expand relative to each other due to the clearance between the base of recess 27 and lug 15 in the horizontal direction and they are free to expand in the vertical direction due to the clearance between the base of recess 58a and lug 15. However, any force tending to displace the ring 20 out of concentric relationship is prevented by the support assembly angularly disposed from the displacing force.

The inner ring 21 is supported from ring 20 and concentricity is maintained relative thereto by radial pins 22. The number, size, length, depth of engagement, and material used in these pins is carefully determined to provide the required axial strength to resist the pressure forces across the diaphragm while at the same time providing the minimum conductive heat path between the two rings 20, 21. Pins 22 are prevented from moving radially outwardly by plugs 22a. As described in detail later, the flow of gas between rings 20, 21 is prevented by seal piece 39. It should be noted that since the heat capable of being transferred into the outer ring 20 from the high temperature nozzle ring is large (the temperature differential being on the order of 1000°) relative to the amount permitted to escape through the pins 22, and the internal thermal resistance of the outer ring 20 is small due to the relatively narrow radial dimensions, the radial temperature gradient in split ring 20 is minimized and ring 20 is substantially uniform in temperature throughout. Thus, the tendency for the split ring 20 to substantially change its radius when heated on the outside and cooled on the inside is prevented and the ring 20 is round under all operating conditions even though the halves of the ring 20 are not rigidly connected together.

Inner ring 21, which is made in halves 21a, 21b, has connected thereto axially spaced labyrinth type packing rings 32, 33 which restricts the flow of cooling gas between the diaphragm assembly and the rotor 1. As shown in the drawings, packing members 32, 33 are intended to represent a well-known type of packing, various forms of which are familiar to those acquainted with the conventional turbine art. The heat conducted from ring 20 into inner ring 21 by the pins 22 is small in relation to the conductivity of the inner ring 21, and also small in relation to the amount of heat capable of being taken out of the inner ring by the air leakage underneath the packing pieces. Therefore, split ring 21 will run at a substantially constant temperature throughout and remain round under all operating conditions. Keys 34, 35 are provided to prevent relative axial and transverse movement between the two halves 21a, 21b of ring 21. Keys 34, 35 are secured to the lower half of ring 21 by screws 34a, 35a (see Figs. 2 and 3). With this arrangement, the inner ring 21 will also assume a temperature close to that of the turbine wheels 1, 3, and the packing clearances controlling the leakage flow will therefore remain relatively constant both during starting and in normal operation of the turbine.

With the arrangement so far described, the effect is to establish two concentric rings which can freely expand and contract relative to each other radially, while at the same time remain concentric and together with seal piece 39 and packing 32, 33 form a barrier preventing any appreciable air flow from one side of the diaphragm assembly to the other. The radial freedom permitted by the dowels 22 and the small amount of heat transfer that takes place between the two rings 20, 21 lets each ring seek a steady-state temperature, substantially unaffected by the other. The heat transfer into the outer ring 20 from the high temperature nozzle is large relative to the amount permitted to escape through the pins 22, and the internal thermal resistance of the outer ring 20 is small thus creating a piece which will be uniform in temperature throughout and, therefore, will be round under all operating conditions. The heat transferred into the inner ring 21 by the pins 22 is small in relation to the internal conductivity of the inner ring 21 and also small in relation to the amount of heat capable of being taken out of the inner ring 21 by the air leakage underneath the packing pieces 32, 33. Therefore, ring 21 will also run at a constant temperature throughout and will remain round under all operating conditions.

As previously mentioned, it is necessary to provide cooling air to cool the bucket wheels 2, 3 to maintain them at the required low temperature for safe operation. This cooling air must be introduced between the turbine wheels 2, 3 with a minimum of contact with the hot surfaces to minimize the temperature rise of the cooling air to obtain the most effective cooling. To accomplish this, the cooling gas which enters through conduit 18, flows through a plurality of passages 12a into annular recess 19, and holes 36 into annular space 37. The cooling gas is shielded from the hot inner side wall 11 by an annular sheet metal deflector plate 28 and from the space 38 between rings 20, 21 by a two-piece laminated seal piece 39. The thickness, material and depth of engagement of seal piece 39 are carefully established to provide minimum heat flow consistent with the strength requirements. Also, since heat transferred to a moving fluid is greatly affected by the velocity of the moving fluid, light sheet metal deflector plates 40, 41 which serve as radiation shields are provided on both sides of the diaphragm proper. These plates prevent excessive heating of the wheel space cooling air and consequent cooling of the outer diaphragm ring 20 by shielding the cooling air in space 37, etc., from the heat generated by "windage" created by the turbine wheels. These deflector pieces 40, 41 are supported as far away from rings 20, 21 as possible, on light rods 42, 43 which are spaced from rings 20, 21 by spacers 44, 45, and 46, 47 respectively, to limit conduction of heat from the diaphragm rings to the sheet metal deflectors. Since adequate spacing between ring 20 and bucket wheel 3 is here found impracticable, a heat insulator 48 is provided between the outer ring and the wheel. It remains to note that annular seals 50, and 51a, 51b are secured to deflector plates 40 and insulator 48 respectively to prevent the leakage of motive fluid into the space between bucket wheels. The even expansion of ring 20 prevents the seals 50, 51a from being distorted by engagement with the radial seal flanges 2b, 3b of bucket wheels 2, 3 respectively.

It remains to note that the cooling gas admitted through conduit 18 is under a pressure higher than the motive fluid flowing through the nozzle ring 13. Also, since there is an appreciable pressure drop across the nozzle diaphragm blades 13 (on the order of 20 pounds per square inch), the pressure at the downstream side of wheel 2 is appreciably higher than that adjacent the upstream side of second stage wheel 3. By directing the cooling air to the high pressure side of the shaft packing 32, the cooling air flows through the space adjacent wheel 2, and to the right past the packing 32 into the space adjacent wheel 3, as indicated by the flow arrows in Fig. 1.

The cooling air that flows leftward, leaks past the sealing rings 50, to produce a cooling effect on the wheel 2. This cooling air is discharged in the manner indicated by arrow 52 into the motive fluid flow path. The cooling air that flows to the right through the labyrinth seals 32, 33 passes radially outward along the adjacent face of bucket wheel 3 and is discharged in the manner of the arrow 53 into the motive fluid flow path.

It will be seen from the above that the comparatively high-pressure air admitted through conduit 18 cools the labyrinth seal members 32, 33 so that desirably close clearances with the rotor may be maintained. This air also cools the adjacent faces of both the first and second stage bucket wheels.

Thus it can be seen that my invention provides a novel diaphragm assembly which will not distort when subjected to the high differential temperatures existing between the motive fluid and the cooling air for cooling the rotor, and which assembly also provides cooling gas at the desired temperatures to maintain the bucket wheels at the proper temperatures for safe operation.

It will be obvious to those skilled in the art that numerous changes and substitutions of mechanical equivalents might be made in the construction of the diaphragm assembly. For example, the radially spaced, concentrically disposed ring arrangement is not limited to an arrangement in which cooling air is applied through the nozzle blades. It is, of course, desired to cover by the appended claims all such modifications as fall within the true spirit and scope of the invention.

What I claim as new and desire to secure by Letters Patent of the United States is:

1. In a high temperature turbine having a rotor assembly including a plurality of axial flow bucket wheels each carrying a circumferential row of buckets, a main casing, a nozzle assembly supported by the casing and located between a pair of adjacent bucket wheels for directing the flow of motive fluid to the buckets, the combination of diaphragm means supported by and extending radially inward from the nozzle assembly, the diaphragm means including two radially spaced concentrically disposed rings, each of said rings being made in at least two segments, means disposed on said nozzle assembly and cooperating with said outer ring in a plane normal to the rotor axis for locating the outer ring in concentric relationship relative to the nozzle assembly whereby radial expansion in response to differential thermal expansion is permitted, means located at the circumferentially adjacent ends of said respective ring segments for preventing axial and transverse movement of the ring segments of the outer ring relative to each other and the ring segments of the inner ring relative to each other, means connecting together said inner and outer rings for relative radial movement therebetween, said means having a minimum cross-sectional area and extending radially between said inner and outer rings whereby a minimum amount of heat is conducted from the outer ring to the inner ring, and sealing means secured to the diaphragm means and forming close clearances with the rotor assembly to prevent the leakage of motive fluid around the nozzle assembly.

2. In a high temperature turbine including a rotor assembly containing at least two axial flow bucket wheels each of which carry a circumferential row of buckets, a main support casing, a nozzle assembly supported by the casing and located between adjacent bucket wheels, the combination of diaphragm means supported by and extending radially inward from the nozzle assembly, said diaphragm means comprising two concentrically disposed radially spaced rings each of which is made in at least two mating portions, means disposed on the nozzle assembly and cooperating with the outer ring in a plane normal to the rotor axis for locating the outer ring relative to the nozzle assembly, a plurality of circumferentially disposed radially extending pins interconnecting the inner and outer rings to provide for relative radial movement between said inner and outer rings, said pins having a minimum cross-section area to limit the conduction of heat between the inner and outer rings, first key means interconnecting the ends of the mating outer ring portions for preventing axial and transverse movement of the outer ring portions relative to each other, second key means interconnecting the ends of the mating inner ring portions for preventing axial and transverse movement of the inner ring portions relative to each other, and sealing means secured to the rings and forming close clearances with the rotor assembly to prevent the leakage of motive fluid around the nozzle assembly.

3. In a high temperature turbine having a rotor assembly containing a plurality of axial flow bucket wheels each carrying a circumferential row of buckets, a main casing, a nozzle assembly supported by the casing and located between a pair of adjacent bucket wheels, the combination of diaphragm means supported by and extending radially inward from the nozzle assembly to prevent the leakage of motive fluid around the nozzle assembly, the diaphragm means including two radially spaced concentrically disposed rings made in halves for minimizing the flow of heat thereacross, first key means preventing axial and transverse movement of the outer ring halves relative to each other, second key means preventing axial and transverse movement of the inner ring halves relative to each other, means supporting the outer ring relative to the nozzle assembly while permitting radial expansion therebetween in response to differential temperatures, means between the inner and outer rings for locating the inner ring relative to the outer ring with a minimum cross-sectional area for limiting the heat flow therebetween while permitting relative radial expansion between the rings, means for supplying cooling fluid through the nozzle assembly to cool the bucket wheels adjacent the diaphragm means, radiation shielding means including relatively thin radially extending non-load-supporting plates secured to the diaphragm means and axially spaced from the diaphragm means to the extent permitted by the adjacent bucket wheels for minimizing the heating of the cooling fluid during transmission from the nozzle assembly to the bucket wheels, and a plurality of sealing ring members having concentric annular edge portions secured to the diaphragm means and forming close clearances with the adjacent wheels to prevent the leakage of motive fluid around the nozzle assembly.

4. In a high temperature turbine including a rotor assembly comprising a plurality of bucket wheels each carrying a circumferential row of buckets, a main support casing, a nozzle assembly secured to said support casing for directing the flow of motive fluid between adjacent bucket wheels, diaphragm means supported by and extending radially inward from the nozzle assembly, the combination of diaphragm means comprising radially spaced concentrically disposed rings each of which are made in halves, means for preventing axial and transverse movement of the halves of each of the rings relative to each other, means connecting the outer ring to said nozzle assembly whereby radial expansion of said outer ring is permitted, means for supplying cooling air through said nozzle assembly to cool said diaphragm means, means locating the inner and outer rings concentrically for radial movement relative to each other, said means comprising a plurality of circumferentially spaced radially extending pins interconnecting the inner and outer rings, radiation shields mounted on the diaphragm on opposite sides thereof and axially spaced from the diaphragm to the extent permitted by the adjacent bucket wheels for directing the cooling fluid from the nozzle assembly past the diaphragm means to the bucket wheels adjacent the diaphragm with a minimum of heating, and sealing means connected to the diaphragm means for preventing the leakage of motive fluid around the nozzle assembly.

5. In a high temperature turbine having a rotor assembly with at least two axial flow bucket wheels each having a circumferential row of buckets, a main casing, and a nozzle assembly supported by the casing and located between first and second adjacent bucket wheels, the combination of diaphragm means supported by and extending radially inward from the nozzle assembly and including inner and outer radially spaced concentric rings, means locating the outer ring radially inward from and concentric with the nozzle assembly, radially disposed pin means supporting the inner ring concentric within the outer ring while permitting differential radial expansion therebetween, said pin support means having a minimum cross-section area to limit the conduction of heat between the inner and outer rings, sealing means extending radially between the inner and outer rings for preventing the flow of cooling fluid therebetween and comprising a thin annular wall member of small cross-section area extending between the inner and outer ring members and supported in sealing relation therewith, first annular shielding means axially spaced and supported from one side of the inner and outer rings by support members having a small cross-section area of minimum heat conductivity and defining with said inner and outer rings a first passage extending radially inward, and defining with the first bucket wheel a second passage extending radially outward, second annular shielding means supported by the other side of said inner and outer rings and defining with the second bucket wheel a third passage extending radially outward, packing means supported by the inner diaphragm ring and forming close clearances with the rotor, and means for supplying cooling fluid through the nozzle assembly and said first and second passages to cool the portion of the first bucket wheel adjacent the first annular shielding means and for supplying cooling fluid between the packing means and the rotor into the third passage to cool the portion of the second bucket wheel adjacent the second annular shielding means.

6. In a high temperature turbine having a rotor assembly with at least two axial flow bucket wheels each having a circumferential row of buckets, a main casing, and a nozzle assembly supported by the casing and located between first and second adjacent bucket wheels, the combination of diaphragm means supported by and extending radially inward from the nozzle comprising two radially spaced concentrically disposed rings, each of said rings being made in halves, first outer ring locating means including radially extending projections disposed on said nozzle assembly and cooperating with radially directed recesses defined by said outer ring halves to locate the outer ring in concentric relationship relative to the nozzle assembly thereby allowing differential radial expansion therebetween, first key means interconnecting the ends of the outer ring halves for preventing axial and transverse movement of the outer ring halves relative to each other, second key means interconnecting the ends of the inner ring halves for preventing axial and transverse movement of the inner ring halves relative to each other, said inner and outer rings defining a plurality of circumferentially spaced radially-directed opposing cylindrical recesses, a plurality of circumferentially spaced radially extending pins disposed in said opposed inner and outer ring recesses for locating the inner ring relative to the outer ring and having a minimum cross-sectional area for limiting the heat flow therebetween while permitting relative radial expansion between the inner and outer rings, and sealing means secured to the inner ring and forming close clearances radially with the turbine rotor, whereby said inner ring is maintained in a substantially circular shape without appreciable thermal distortion so as to reduce leakage between said sealing means and the rotor.

References Cited in the file of this patent

UNITED STATES PATENTS

| 2,447,942 | Imbert et al. | Aug. 24, 1948 |
| 2,488,867 | Judson | Nov. 22, 1949 |
| 2,488,875 | Morley | Nov. 22, 1949 |
| 2,606,741 | Howard | Aug. 12, 1952 |
| 2,640,319 | Wislicenus | June 2, 1953 |
| 2,741,455 | Hunter | Apr. 10, 1956 |